Aug. 24, 1937.   J. H. DE BOER ET AL   2,091,031
METHOD OF MANUFACTURING PHOTOTUBES
Filed Feb. 28, 1935
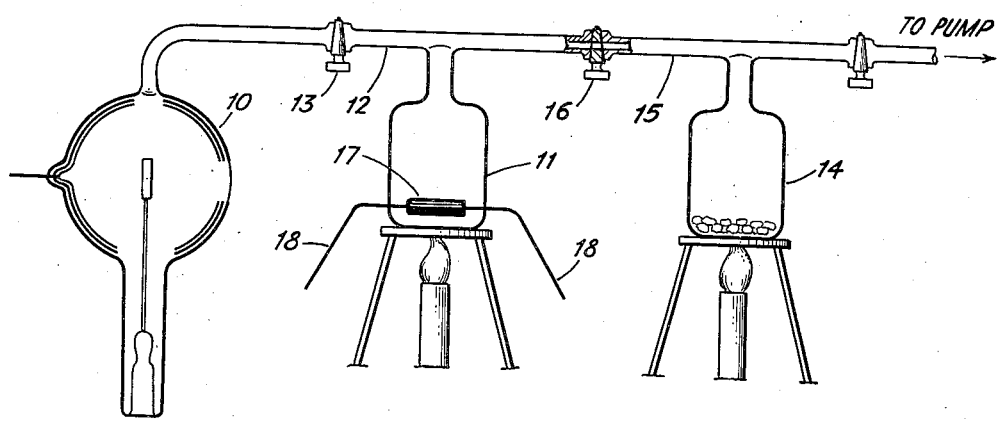
INVENTORS
JAN HENDRIK de BOER
MARTEN CORNELIS TEVES
BY   HENDRIK LEMS
Charles M McClair
ATTORNEY

UNITED STATES PATENT OFFICE 2,091,031

METHOD OF MANUFACTURING PHOTOTUBES

Jan Hendrik de Boer, Marten Cornelis Teves, and Hendrik Lems, Eindhoven, Netherlands, assignors to Radio Corporation of America, a corporation of Delaware Application February 28, 1935, Serial No. 8,582
In Germany March 8, 1934

4 Claims. (Cl. 250—27.5)

Our invention relates to light sensitive electron discharge devices, more particularly to an improved photo-cathode and the method of manufacturing such cathodes.

In the conventional phototube or other electron discharge tube having a sensitive photoelectric electrode or photo-cathode, the photocathode is formed within the tube at the point desired for the cathode from a layer of metal oxide deposited within the tube. This is usually done by providing a layer of metal, for example silver, within the tube and then superficially or entirely oxidizing this layer by cathodic oxidation in an atmosphere containing oxygen. After the metal oxide layer has been formed and, if desired, after the excess of oxygen has been removed, a photo-electric metal, usually alkali or alkaline earth metal, is introduced into the tube which is then submitted to a treatment such that the metal oxide is reduced by the photoelectric metal. A layer or film is thus formed which contains a mixture of alkali or alkaline earth oxide and particles of the reduced metal. The sensitiveness of the electrode may be increased by having the mixture contain in addition particles of the photo-electric metal itself. A thin layer of the photo-electric metal deposits on the mixed layer. The sensitiveness is greatest when the thin layer of photo-electric metal is monomolecular or is even less dense.

The excess photo-electric metal introduced into the tube is then removed which may be effected by withdrawing it from the tube or by fixing it within the tube. Withdrawal from the tube may be effected by pumping it away while heating the tube at the same time. The excess may be fixed within the tube by means of a substance which will take up the photo-electric metal, for example carbon, or of a compound which chemically reacts with the photo-electric metal, such for example as lead oxide, or again of a metal which will alloy with the excess of photo-electric metal, such for example as tin or lead.

The withdrawal of the excess of photo-electric metal complicates the manufacture of the discharge tube while several of the known methods of making the excess harmless are subject to several objections. Thus the pumping away of the excess requires the tube to be heated. Heating adversely affects the photo-electric electrode since the latter when raised to too high a temperature loses its structural formation upon which its high sensitivity depends. Due to the fixation of the excess of photo-electric metal, gases which reduce the sensitiveness of the photo-electric electrode are often set free, particularly if the photo-electric electrode has a monomolecular photo-electric metal layer.

It is the principal object of our invention to provide an improved method for making a light sensitive electron discharge device, particularly the photo-electrode of such a device.

According to our invention, which eliminates the disadvantages of the methods now used for making light sensitive electron discharge devices there is introduced into the photo-tube by liberating within it, such a small amount of the photoelectric metal that the entire quantity of the metal is taken up by the oxidized silver film of the photo-electric electrode so that it is not necessary to remove any excess of photo-electric metal. This amount of the photo-electric metal may be obtained in different ways.

The novel features which we believe to be characteristic of our invention are set forth with particularity in the appended claims, but the invention itself will best be understood by reference to the following description taken in connection with the accompanying drawing in which the figure is a diagrammatic representation of the apparatus by which our invention is practiced.

Use may be made, for example, of a substance which adsorbs the photo-electric metal. If the photo-electric metal is an alkali-metal such as caesium it is of advantage to employ zirconium oxide, magnesia or calcium fluoride to adsorb the alkali metal. Referring to the drawing, a definite quantity of the adsorbing substance may be contained in a separate receptacle 11 attached to the photo-tube envelope 10, for example by a connecting tube 12 provided with a valve 13. If communication is established by means of a tube 15 provided with a valve 16 between this separate receptacle 11 and a vessel 14 containing an alkali metal such as caesium and if this vessel is kept at a temperature slightly less than that of the separate receptacle, part of the alkali metal will be adsorbed by the adsorbing substance in the separate receptacle. Communication between the separate receptacle 11 and the vessel 14 can then be interrupted by closing valve 16 and after the metal oxide layer has been formed within the photo-tube 10 the valve 13 in the tube connecting the envelope 10 and the separate receptacle 11 is opened. The alkali metal adsorbed is then set free again by heating the separate receptacle 11, and driven into the photo-tube envelope whereupon the metal oxide is reduced in the manner above described and the photo-electric metal settles in the form of a thin layer on the layer formed during the reduction and, as the case may be, also penetrates into the layer.

It is evident that the amount of photo-electric metal to be introduced depends on the size of the electrode to be produced and of the quantity of metal oxide to be reduced. On the other hand, the amount of photo-electric metal introduced is determined by the amount and the nature of the adsorbing substance. The quantity of adsorbing material to be employed can be experimentally determined in a simple manner for each kind of photo-electric electrode.

The photo-electric metal adsorbed need not always be expelled from the separate receptacle by heating. It is often possible to bring over the adsorbing substance with the photo-electric metal adsorbed thereto from the separate receptacle into the discharge tube and then to liberate the metal from the adsorbing substance. Such is the case, for example, if zirconium-oxide, to which caesium readily adsorbs, is utilized as the adsorbing substance. The powder, which has a blue color after the adsorption, can be easily displaced in vacuo, for example, by shaking.

The zirconium oxide powder may also be pressed in form of a pastil so that it can be easily transferred from the separate receptacle into the discharge tube.

In order to increase the adsorbing capacity of the substance utilized it is frequently advantageous to vaporize and to deposit this substance in vacuo. If, for example, a filament coated with calcium fluoride is arranged in the separate receptacle and if after exhaustion of the receptacle this calcium fluoride is vaporized, it settles in such form that it has a very high adsorption capacity.

The photo-electric metal to be introduced into the photo-tube may be obtained by a controlled decomposition of a compound of the metal. If, for example, the tube envelope has mounted within it a metal plate provided with a compound such as caesium chloride or caesium iodide and if this plate is arranged opposite an electron-emitting filament (a tungsten or thoriated tungsten cathode) which has been given a negative potential with respect to the plate, an electron current may be passed thru the compound with the result that the latter is decomposed by electrolysis. The control of the amount of current thru the tube allows liberating within the tube a very exactly determined quantity of photo-electric metal. It is of advantage in this case to make the member to which the compound is applied, of a metal adapted to combine with the metal compound remaining. If, for example, use is made of alkaline halides, it is of advantage to utilize silver, which fixes the halogen liberated.

In many cases the decomposition of the compound may also be brought about by exposure to radiation. Thus, for example, caesium chloride and sodium chloride are decomposed by means of X-rays. The desired amount of the alkali metal may be obtained in this case by controlling the intensity and the duration of the exposure.

The decomposition may also be brought about by heating. Use may be made in this case, for example, of graphite compounds. As is well-known, graphite combines with potassium to form a substance which, according to the method of preparation, may be represented by the formula $C_8K$ or $C_{16}K$. The first-mentioned compound has a cupreous red, the last-mentioned one, a bluish-black color. There are known similar compounds of rubidium and caesium. These graphite compounds are quantitatively decomposed by heating so that they constitute a very suitable means of introducing a predetermined amount of alkali metal into the discharge tube. In this case the procedure is as follows: A piece of graphite 17 is arranged in the separate receptacle 11 between two terminals provided with current supply wires 18. After exhaustion an excess of potassium is introduced from vessel 14 into the receptacle 11, the potassium combining with the graphite. Superfluous potassium is again removed by pumping from the receptacle. After communication between the vessel 14 containing the potassium and the receptacle 11 has been broken, communication between the photo-tube envelope and the receptacle 11 is established. By passing an electric current thru the graphite compound the latter is heated so as to be quantitatively decomposed, the potassium being consequently liberated. In this case, too, the amount of the alkali metal that is to be introduced into the tube envelope 10 may be determined by utilizing a definite amount of graphite which may be experimentally determined.

The graphite may be provided in the tube envelope near the aperture communicating with the connecting tube 12 joining the separate receptacle and the tube envelope instead of in the receptacle 11. The receptacle containing the alkali metal is heated to slightly above room temperature which results in the alkali metal being distilled from the receptacle 11 into the tube envelope 10. With the vapor pressures occurring at the temperature obtained, the alkali metal practically moves as molecular rays so that each alkali atom impinges on the graphite placed near the aperture. The amount of graphite is so chosen that even in the case of a marked under-saturation of alkali metal there is still in the graphite an excess of alkali metal with respect to the amount required for the photo-electric cathode. After the formation of the graphite-alkali compound, which consequently is unsaturated in this case, this compound is thermally decomposed, for example, by the passage of an electric current. It is again easy to determine experimentally the intensity of the current to be passed in order to liberate an exactly determined amount of alkali metal.

Besides, the correct amount of photo-electric metal may also be introduced into the discharge tube envelope with the aid of metals adapted to form with the photo-electric metal an alloy from which this metal can be liberated again by heating. For example, tin and lead may be advantageously employed for this purpose. These metals may be applied, for example, to an incandescent helix of iron wire, which may be arranged in the same manner as described for graphite near the aperture communicating with the connecting tube joining the discharge tube envelope to the receptacle containing alkali metal. The alkali molecules impinge in this case on the tin or lead and are taken up thereby. Subsequently, the exact amount of alkali metal may be set free within the tube by a controlled heating of the alloy produced.

A favorable condition in carrying out the process according to the invention is that the amount of photo-electric metal introduced into the tube envelope or developed therein many vary within definite limits, for the above described mixed layer (metal particles and particles of the oxide of the photo-electric metal) can take up slightly varying quantities of photo-electric metal. The process is therefore suitable for being carried into effect by factory methods.

The invention is not limited to the manufacture of photo-electric electrodes in phototubes, but it also includes the manufacture of such electrodes in other types of discharge tubes.

While we have indicated the preferred embodiment of our invention of which we are now aware and have also indicated only one specific application for which our invention may be employed, it will be apparent that our invention is by no means limited to the exact forms illustrated or the use indicated, but that many variations may be made in the particular structure used and the purpose for which it is employed without departing from the scope of our invention as set forth in the appended claims.

What we claim as new is—

1. A method of manufacturing photo-electric electrodes in electron discharge tubes, including forming a metal oxide layer in an evacuated envelope, connecting said evacuated envelope with a receptacle containing a graphite-alkali metal compound and passing an electric current of predetermined intensity through said graphite alkali metal compound to liberate a definite amount of alkali metal sufficient to reduce the metal oxide in the evacuated envelope.

2. A method of manufacturing photo-electric electrodes in electron discharge tubes, including forming a metal oxide layer in an evacuated envelope, connecting a receptacle containing a predetermined amount of graphite to said evacuated envelope, connecting a vessel containing an alkali metal to said receptacle, distilling said alkali metal and absorbing the same by means of said graphite and passing an electric current through the resulting graphite-alkali metal to liberate a definite quantity of the alkali metal sufficient to reduce substantially all of the metal oxide layer in the evacuated envelope.

3. A method of manufacturing photo-electric electrodes in electron discharge tubes, including forming a metal oxide layer in an evacuated envelope, connecting said evacuated envelope with a receptacle containing graphite, connecting a vessel containing an alkali metal to said receptacle, distilling said alkali metal and absorbing the same by means of the graphite, and passing an electric current of predetermined intensity through said graphite to liberate a definite amount of alkali metal sufficient to substantially reduce all of the metal oxide in the evacuated envelope.

4. A method of manufacturing photoelectric electrodes in electron discharge tubes including forming a metal oxide layer in an evacuated envelope provided with an aperture, positioning graphite near said aperture which will combine with an alkali metal, exposing said graphite to an alkali metal vapor whereby alkali metal will be combined with the graphite positioned near the aperture within the evacuated envelope to form a graphite alkali metal compound, and passing an electric current of predetermined intensity through said compound containing said alkali metal to liberate a definite quantity of alkali metal sufficient to reduce substantially all of the metal oxide layer within the evacuated envelope.

JAN HENDRIK DE BOER.
MARTEN CORNELIS TEVES.
HENDRIK LEMS.